Figure 1:
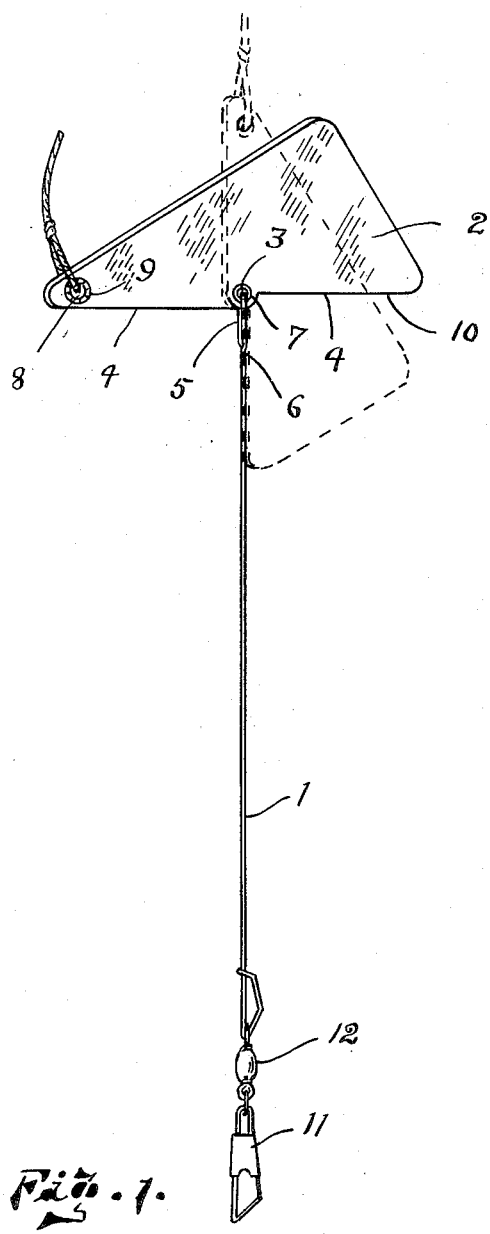

Nov. 21, 1950     S. J. SICOTTE     2,531,235
FISH LANDING GRIP
Filed Oct. 27, 1948

Inventor
Sidney J. Sicotte.
By
Geo Stevens.
Attorney

Patented Nov. 21, 1950

2,531,235

UNITED STATES PATENT OFFICE 2,531,235

FISH LANDING GRIP

Sidney J. Sicotte, Hibbing, Minn.

Application October 27, 1948, Serial No. 56,690

1 Claim. (Cl. 43—43.13)

This invention relates to the art of fishing and has special reference to novel means directly associated with the fishing line adjacent the lure.

When landing fish, especially large ones, without the use of a net or gaff, one will slide his hand down the fishing line to the leader and grab same to lift the fish into the boat in order to prevent breaking the fishing line or pole, and also to prevent the loss of the fish. It is sometimes very difficult to get a good grip on the leader as they are usually of very thin spring wire or woven cable, which makes a firm grip very difficult.

One of the principal objects of the instant invention is to provide novel means for obtaining a positive hand grip on a fishing leader when landing a fish.

Another object is to provide a grip which functions as a keel and prevents the fishing line from becoming twisted from the action of the fishing lure.

Another object is to provide a grip which is not subject to becoming tangled and which will positively maintain a position in alinement with the fishing line at all times during its use except when forced out of position by one's hand when so desired.

A further object is to provide a keel and grip member which is practically invisible in the water.

A further object is the provision of a combined leader and grip, and also, means for attaching a fishing line and lure thereto.

A still further object is to provide a grip member which forms a part of the fishing line and which automatically assumes a position in alinement with the line when in use.

These and other objects and advantages will become more apparent as the description of the invention proceeds.

In the accompanying drawing forming a part of this application:

Fig. 1 is a perspective view of the presently preferred form of the invention.

In the drawing, the reference numeral 1 indicates a leader, made, preferably, of a single length of spring steel wire.

The reference numeral 2 indicates a combined grip and keel member which is made, preferably, of transparent plastic material so as to be practically invisible in the water. The member 2 is preferably triangular in shape, and has a perforation 3 substantially centrally of its longer side 4 and adjacent the marginal edge thereof in which the leader 1 is pivotally carried at its upper end. The upper end of the wire leader is bent to form an elongated bight 5 which forms the pivotal connection for the parts and permits the pivoting of the grip in only one plane as the bight 5 straddles the sides of the grip. The bight may be closed or secured either by a snap or safety pin catch 6 formed from the leader end as shown in Fig. 1, or by twisting the end of the leader around itself as shown in Fig. 2.

As stated the grip member 2 is made, preferably, of transparent plastic, and in order to prevent the enlargement of the perforation or hole 3 by the pivotal movement of the leader, an eyelet 7, preferably of brass, is installed in the hole 3.

It is to be noted that the grip member 2, while being preferably triangular in shape, is not equilateral or isosceles so that there is more area on one side of a line perpendicular to the base or longer side 4 through the hole 3, than there is on the other side of such a line. This provides for proper functioning of the device in the water to prevent twisting of the fishing line. The portion having the smaller area is the leading or front portion of the device, and a perforation or hole 8 is provided adjacent the foremost edge thereof to receive the fishing line or a suitable snap attached to the fishing line. The hole 8 is also provided with an eyelet, indicated at 9, to prevent undue wear on the hole in the plastic grip.

In operation the grip member 2 is carried in the position shown in dotted lines, Fig. 1, that is with the holes 3 and 8 substantially alined with the leader and fishing line as the stress between the fishing line and lure tends to bring the holes in alinement with the line of stress.

To facilitate the proper alinement of the grip member with the fishing line, a part of the trailing portion of the side 4 of the grip is cut away as at 10 to a point opposite the hole 3 and parallel with the base line or longest side of the grip so that the base line of the device is in two substantially parallel parts in offset relation to each other. This permits the grip to lie in alinement with the fishing line and leader when in use as shown in dotted lines, Fig. 1. The trailing portion of the grip shown in Fig. 1, having a greater area than the leading portion thereof, assists in maintaining the grip member in its desired alinement when being drawn through the water, and also acts as a keel and prevents the fishing line from being twisted by the action of a fishing lure which may be attached at the lower end of the leader 1, a suitable attaching means such as the snap or catch 11 being provided for that purpose.

It is deemed advisable to use a swivel 12 between the leader and the lure to absorb the possible twisting action of the fishing lure, and the keel member will assist the swivel in its action by preventing the leader and line from twisting and thereby forcing all of the twist absorption to take place in the swivel. This feature is deemed admirable in that it is well known among fishermen that a swivel will not always absorb the twist of a fishing lure, and the fishing line will often become hopelessly twisted axially, which is an annoyance that is not easily remedied.

The use of the member 2 as a grip is also deemed admirable in that when a fish is caught, it may be played up to the boat or adjacent the fisherman where he may slide one hand down the line, while keeping the line taught with the other hand, until he feels the grip. Then, with two fingers straddling the leader the grip may be pivoted into a position at substantially right angles to its normal position and the two fingers may engage the base edges thereof in a firm hold on opposite sides of the leader. The fish may then be lifted out of the water without the danger of breaking the fishing line and losing the fish thereby.

It is deemed apparent that the instant grip could be used without a so-called leader if desired, by attaching same to a portion of fishing line or to the swivel adjacent the lure.

From the above it is deemed apparent that I have provided a novel, improved leader-grip having desirable no-twist features.

Having thus described my invention, what I claim is:

A device to prevent a fishing line from twisting and providing a grip for use in landing fish comprising: a fishing leader; a substantially triangularly shaped grip and keel member, said member having a longest side and a next longest side which are joined in an acute angle, and a shortest side joining said longest and next longest sides; said member having a perforation within said acute angle adjacent the apex thereof to which said fishing line is attached, and a second perforation adjacent said longest side and positioned centrally of the latter to which said leader is attached whereby the major area of said member is on the leader side of said second perforation when said member is drawn through the water by said fishing line and will act as a keel to prevent said line from twisting; and said leader being pivotally carried in said second perforation whereby said member may be pivoted so that said longest side will extend at substantially right angles to said leader to serve as a finger grip for landing fish.

SIDNEY J. SICOTTE.

REFERENCES CITED

The following references are of record in the file of this patent:

UNITED STATES PATENTS

| Number | Name | Date |
|---|---|---|
| 1,033,464 | Pomeroy | July 23, 1912 |
| 1,802,295 | Wear | Apr. 21, 1931 |
| 2,390,584 | Hardin | Dec. 11, 1945 |
| 2,482,901 | Cianfrone | Sept. 27, 1949 |

FOREIGN PATENTS

| Number | Country | Date |
|---|---|---|
| 846,240 | France | June 5, 1939 |